United States Patent
Newallis et al.

[15] 3,691,276
[45] Sept. 12, 1972

[54] PROCESS FOR PREPARING O-ARYL PHOSPHONOCHLORIDOTHIONATES

[72] Inventors: Peter E. Newallis, Leawood, Kans. 66206; Hans L. Nufer, Creve Coeur, Mo. 63141; John P. Chupp, Kirkwood, Mo. 63122

[73] Assignee: Monsanta Company, St. Louis, Mo.

[22] Filed: March 13, 1970

[21] Appl. No.: 19,485

[52] U.S. Cl. ............260/973, 252/461, 252/463, 252/472, 252/475, 252/476, 260/951, 260/954, 260/955, 260/960
[51] Int. Cl. .................................C08f 9/20
[58] Field of Search..................260/973

[56] References Cited

UNITED STATES PATENTS 2,624,745  1/1953  Schrader.............260/973 X 3,205,251  9/1965  Mitchell...............260/973 X

FOREIGN PATENTS OR APPLICATIONS 559,547  7/1958  Canada................260/973

*Primary Examiner*—Joseph Rebold
*Assistant Examiner*—Anton H. Sutto
*Attorney*—Paul C. Krizov, Neal E. Willis and John J. Henschke, Jr.

[57] ABSTRACT

Preparation of O-aryl phosphonochloridothionates by the reaction of a phenolic compound with a thionophosphonic dichloride in the presence of a catalyst which can be metallic zinc, copper, aluminum, titanium, tin, antimony, iron or cobalt, or halides thereof.

10 Claims, No Drawings

PROCESS FOR PREPARING O-ARYL PHOSPHONOCHLORIDOTHIONATES

This invention relates to O-aryl phosphonochloridothionates and particularly to new and useful methods of making them.

It has been found in accordance with the present invention that O-aryl phosphonochloridothionates of the formula

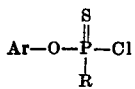

wherein R is alkyl of from one to four carbon atoms, aryl or alkaryl of from six to 16 carbon atoms and Ar is phenyl or naphthyl with or without substituents of halo, nitro, trifluoromethyl or alkyl or alkoxy of from one to four carbon atoms can be prepared by the reaction of a phenolic compound of the formula

in which Ar has the significance defined above with a thionophosphonic dichloride of the formula

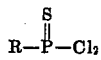

in the presence of a catalyst or a promoter.

In the above formula, the alkyl and alkoxy substituents can be methyl, ethyl, n-propyl, isopropyl, n-butyl, secondary butyl or tertiary butyl, and the corresponding alkoxy groups.

The catalyst used in accordance with the present invention can be metallic zinc, copper, aluminum, titanium, tin, antimony, cobalt, iron, or halides thereof. Each member of this group of catalysts results in promoting the reaction, but it is preferred to utilize copper in powdered or dust form, because of relatively increased efficiency. Likewise, while any of the halides can be employed, it is preferred to use the chlorides or iodides, rather than the fluorides or bromides because of ease of operation. When the catalyst used is a metal, it is present in the form of a powder or dust, and preferably has an average particle size between about 1 and about 50 microns. This relatively small particle size is not critical, but insures ready distribution throughout the reaction mixture. The catalytic halides are also used in finely divided form, and the particles thereof are usually sufficiently fine to pass through a 200 mesh screen (U.S.S.). The amount of the catalyst employed can vary considerably, but is normally present in proportions between about 0.1 percent and about 10 percent, based on the weight of the phenolic compound. When smaller proportions of the catalyst are employed, their efficiency decreases rapidly, while larger amounts serve no useful purpose.

The reaction of this invention is readily carried out by mixing the reactants and catalyst in a suitable reaction vessel, heating the reaction mixture to a temperature between the melting and boiling points of the phenolic compounds, and maintaining the mixture at this elevated temperature with agitation until the reaction is substantially complete. The completion of the reaction is readily evidenced by the cessation of hydrogen chloride evolution. This normally involves from about 4 to 10 hours and at the end of that time, the reaction mixture is cooled, filtered to remove solids, and the product purified by conventional means. The reaction is essentially an equimolar one, but an excess of the dichloride is usually present to insure adequate yields. With most of the catalysts of this invention, it has been found that the mole ratio of the phenolic reactant to the dichloride should be in the neighborhood of about 1:2. When metallic copper is used in this capacity, however, much smaller excesses of the dichloride are required to provide excellent yields, and the mole ratio can approach 1:1.

The degree of completion of the reaction varies considerably, dependent upon reaction conditions, the time involved, and the particular system utilized. With some catalysts, more time, higher temperatures, or larger amounts of the catalytic agent may be required to obtain adequate yields of the O-aryl phosphonochloridothionate. For example, between about 3 and 3.5 percent powdered copper, based on the weight of the phenol is required, but only about 1 percent of most of the other catalysts used in accordance with the present invention are needed to obtain comparable yields. When attempts were made to carry out the reaction under optimum conditions in the absence of a catalyst, no reaction between the dichloride and the phenolic compound was observed.

The invention and the various ramifications will be more readily understood by reference to the following examples. In these examples and throughout the specification, all proportions are expressed by parts by weight, unless otherwise designated.

EXAMPLE 1

To a suitable reaction vessel equipped with a thermometer, agitator, and reflux condenser was charged approximately 94 parts of phenol, 298 parts of methylthionophosphonic dichloride, about 0.5 parts of zinc chloride and 0.5 parts of cuprous chloride. While agitating, the mixture was heated to about 120°–130°C. and maintained within that temperature range until the evolution of hydrogen chloride ceased. The reaction mixture was cooled, the solids filtered therefrom, and the residue fractionated. The product, which was identified as O-phenol methylphosphonochloridothionate, was a water white liquid which distilled at 90°–93°C. at a pressure of 0.3 mm. of mercury.

EXAMPLE 2

To a suitable reaction vessel as described in Example 1 was charged about 94 parts of phenol, 164 parts of methylthionophosphonic dichloride, and about 3.4 parts of copper powder. While agitating, the mixture was heated to 130°–135°C. and refluxed for about 8 hours, at the end of which time the evolution of hydrogen chloride ceased. The reaction mixture was filtered to remove the solids, and the filtrate fractionated. The product, O-phenol methylphosphonochloridothionate, distilled at 105°–107°C. under a pressure of 4 mm of mercury.

EXAMPLE 3

To a suitable reaction vessel as used in the foregoing examples was charged about 432 parts of cresol, 655 parts of methylthionophosphonic dichloride, and 13.5 parts of powdered copper and about 0.5 parts of cuprous chloride added. The reaction mixture was then agitated, heated to about 180°C. and maintained under these conditions for about 9 hours. The product, O-tolyl methylphosphonochloridothionate, had a boiling point of 124°–127°C under a pressure of 2 mm of mercury.

EXAMPLE 4

Employing the procedure of Example 2, but replacing methylthionophosphonic dichloride with phenylthionophosphonic dichloride, and using the same molar proportions as in the above example, there was obtained O-phenol phenylphosphonochloridothionate, which has a boiling range of 141°–144°C. under a pressure of 1 mm of mercury.

In like manner, O-tolyl ethylphosphonochloridothionate and O-phenyl ethylphosphonochloridothionate were obtained using appropriate reactions.

The O-aryl phosphonochloridothionates prepared in accordance with this invention are particularly useful in the manufacture of insecticidal aryl alkylphosphonothioates. In the preparation of such insecticidal compounds, the O-aryl phosphonochloridothionates of this invention are reacted with a suitable phenolic compound. For example, O-phenol methylphosphonochloridothionate can be readily reacted with 4-nitrophenol to provide O-phenol-O-(4-nitrophenol)methylphosphonothioate. Reactions of this type are fully described in U.S. Pat. No. 3,085,044.

The embodiments of the invention in which an exclusive property or privilege is claimed are defined as follows.

What is claimed is:

1. A method for the preparation of O-aryl phosphonochloridothionates which comprises reacting a thionophosphonic dichloride of the formula

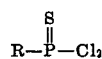

wherein R is alkyl of a maximum of four carbon atoms, aryl or alkaryl, with a compound of the formula Ar — OH wherein Ar is aryl selected from the group consisting of phenyl, naphthyl, and said phenyl or naphthyl substituted with chloro, bromo, fluoro, iodo, nitro, trifluoromethyl, or alkyl or alkoxy of a maximum of four carbon atoms, in the presence of from about 0.1 percent to about 10 percent by weight of said compound of a catalyst selected from the group consisting of copper, cuprous chloride, a mixture of cuprous chloride and copper and a mixture of cuprous chloride and zinc chloride, said copper being in powder form having an average particle size of from about 1 to about 50 microns and said chlorides being in finely divided form having particles sufficiently fine to pass through a 200 mesh screen (U.S.S.).

2. A method for the preparation of O-aryl phosphonochloridothionates which comprises reacting a thionophosphonic dichloride of the formula

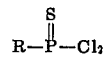

wherein R is alkyl of a maximum of four carbon atoms, aryl or alkaryl, with a compound of the formula Ar — OH wherein Ar is aryl selected from the group consisting of phenyl, naphthyl, and said phenyl or naphthyl substituted with chloro, bromo, fluoro, iodo, nitro, trifluoromethyl, or alkyl or alkoxy of a maximum of four carbon atoms, in the presence of a mixture of about equal parts by weight of cuprous chloride and zinc chloride in finely divided form having particles sufficiently fine to pass through a 200 mesh screen (U.S.S.) which mixture is present in the amount of from about 0.1 percent to about 10 percent by weight of said compound.

3. A method of claim 1 wherein the catalyst is cuprous chloride or a mixture of cuprous chloride and zinc chloride and the mole ratio of said compound to said dichloride is about 1:2.

4. A method of claim 1 wherein the catalyst is copper or a mixture of copper and cuprous chloride and the mole ratio of said compound to said dichloride is about 1:1.

5. A method in accordance with claim 1 in which the catalyst is copper.

6. A method in accordance with claim 1 in which R is methyl and Ar is phenyl.

7. A method in accordance with claim 1 in which R is ethyl and Ar is phenyl.

8. A method in accordance with claim 6 in which the catalyst is copper.

9. A method in accordance with claim 5 in which the mole ratio of said compound to said dichloride is about 1:1.

10. A method in accordance with claim 7 in which the catalyst is copper.

* * * * *